US012753738B1

(12) United States Patent
Danielsen et al.

(10) Patent No.: US 12,753,738 B1
(45) Date of Patent: Oct. 6, 2026

(54) SYSTEM AND METHOD FOR COUNTING FATIGUE-RELATED WINGED ANIMAL STOPS OF A WIND TURBINE

(71) Applicant: GE Vernova Infrastructure Technology LLC, Greenville, SC (US)

(72) Inventors: Darren John Danielsen, Simpsonville, SC (US); Hammad Ahmad, Gray Court, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/309,724

(22) Filed: Aug. 26, 2025

(51) Int. Cl.
*F03D 7/04* (2006.01)
*F03D 17/00* (2016.01)
*G01L 5/00* (2006.01)
*G01L 5/12* (2006.01)

(52) U.S. Cl.
CPC ............ *F03D 7/042* (2013.01); *F03D 17/011* (2023.08); *G01L 5/0052* (2013.01); *G01L 5/12* (2013.01)

(58) Field of Classification Search
CPC ........ F03D 17/00; F03D 7/0292; F03D 7/042; F03D 15/00; F03D 7/02; F03D 7/0264; F03D 7/045; F03D 7/046; F03D 17/011; F03D 80/50; F05B 2270/332; F05B 2270/109; F05B 2270/331; F05B 2270/32; A01K 29/005; G01L 5/0052; G01L 5/12; G01W 1/02; G06V 40/10
See application file for complete search history.

(56) References Cited

U.S. PATENT DOCUMENTS

| | | | | |
|---|---|---|---|---|
| 11,041,483 B2 * | 6/2021 | Tomas | F03D 17/00 |
| 11,635,060 B2 * | 4/2023 | Huang | F03D 80/70 290/44 |
| 2011/0192212 A1 * | 8/2011 | Delprat | F03D 17/00 73/12.01 |
| 2014/0030089 A1 * | 1/2014 | Wickstrom | F03D 7/0292 73/788 |
| 2018/0187651 A1 * | 7/2018 | Frydendal | F03D 7/0292 |
| 2020/0257896 A1 * | 8/2020 | Paszek | G06T 7/277 |

FOREIGN PATENT DOCUMENTS

CN 118934446 A 11/2024

* cited by examiner

*Primary Examiner* — Eric J Zamora Alvarez
(74) *Attorney, Agent, or Firm* — Dority & Manning, P.A.

(57) ABSTRACT

A method of counting winged animal stops of a wind turbine includes receiving, via a controller of the wind turbine, a fatigue-related loading parameter of the wind turbine. The method also includes determining, via the controller, whether or not to count the winged animal stops of the wind turbine based, at least in part, on the fatigue-related loading parameter of the wind turbine. Further, the method includes implementing, via the controller, a control action based on a number of the winged animal stops counted.

20 Claims, 11 Drawing Sheets

SYSTEM AND METHOD FOR COUNTING FATIGUE-RELATED WINGED ANIMAL STOPS OF A WIND TURBINE

FIELD

The present disclosure relates generally to wind turbines, and more particularly, to systems and methods for counting fatigue-related bird stops of a wind turbine.

BACKGROUND

Wind power is considered one of the cleanest, most environmentally friendly energy sources presently available, and wind turbines have gained increased attention in this regard. A modern wind turbine typically includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy. In order to efficiently produce electrical energy, it is typically desirable for the nacelle of the wind turbine to be oriented in aerodynamic alignment with the winds acting on the wind turbine. To properly orient the rotor blades relative to the direction of the wind, wind turbines also typically include one or more yaw drive mechanisms configured to engage a yaw bearing for rotating the nacelle relative to the tower.

During operation, the wind turbine can pose a risk to birds or bats that fly through the swept area of the rotor blades during rotation of the rotor. Some government entities may require wind farms to mitigate that risk, particularly for certain bird or bat species protected by law or government regulations. As such, bird or bat detection and/or bird- or bat-related turbine shutdown is a growing industry need. In some cases, bird or bat stops can occur hundreds or thousands of times per year. Excessive bird or bat stops can cause significant fatigue damage to the rotor blades and/or the tower.

Excessive fatigue damage can lead to exponential inspection and/or repair costs over time. Furthermore, excessive bird or bat stops can also invalidate full-service agreements (FSAs) and/or customer warranties. Thus, insufficient bird or bat stop allowance in the design can prevent wind turbines from being a viable energy producer.

In addition, not all bird or bat stops are equally damaging. Typical methods for calculating fatigue have included rainflow counting. This method properly identifies the largest amplitude cycle to understand which load cycle(s) contributes the most to fatigue damage.

More specifically, as shown in Equation (1) below, damage is proportional to sum of the stress ranges (S) multiplied by the number of cycles (N) at that stress range. X represents the number of unique stress ranges or binned stress ranges.

$$\sum_{1}^{x}(S_1^m * N_1) \quad \text{Equation (1)}$$

Components, such as the rotor blades of the wind turbine, higher Wohler (e.g., m=9 to 14) slopes. High Wohler slopes (m) make such components highly sensitive to large load ranges, meaning the majority of the fatigue damage comes from the highest amplitude cycle, not simply the number of cycles. As an example, for a component that has a Wohler slope of 14, one cycle at range of 25 kNm has the same damage as 1000 cycles at a range of 15.3 kNm.

Modem wind turbines are equipped with bird stop counters that either count all bird stops (an overly conservative method) or only count bird stops above a specific wind speed at shutdown and allow unlimited bird stops at lower wind speeds (a non-conservative method). An issue with counting all bird stops is that this method limits the total amount of bird stops allowed, which can result in unfavorable project economics or an increased risk that customer full-service agreements (FSAs) or warranties are voided. An issue with counting bird stops above a specific wind speed is that this method might not be conservative enough because it does not consider that the wind turbine may have hit higher thrust levels (higher wind speeds) before the bird or bat was detected, thus significantly underestimating fatigue. For example, a wind turbine may start up and operate at a maximum thrust. The next day, winds may be low (e.g., five (5) meters per second (m/s)) and a bird may be detected at turbine shutdown. In this example, although the turbine shutdown when wind was only 5 m/s (e.g., the wind turbine is experiencing less than maximum thrust), the wind turbine experienced maximum thrust the day before. Because the wind turbine has was operating for two days straight, the maximum stress range is established by the maximum thrust, not the thrust at the time of shutdown.

Accordingly, the present disclosure is directed to systems and methods for counting fatigue-related bird stops of a wind turbine that address the aforementioned issues. In particular, the aforementioned issues can be eliminated by implementing an advanced bird or bad stop counter that focuses on the bird or bad stops that are fatigue relevant.

BRIEF DESCRIPTION

Aspects and advantages of the invention will be set forth in part in the following description, or may be obvious from the description, or may be learned through practice of the invention.

In an aspect, the present disclosure is directed to a method of counting winged animal stops of a wind turbine. The method includes receiving, via a controller of the wind turbine, a fatigue-related loading parameter of the wind turbine. The method also includes determining, via the controller, whether or not to count the winged animal stops of the wind turbine based, at least in part, on the fatigue-related loading parameter of the wind turbine. Further, the method includes implementing, via the controller, a control action based on a number of the winged animal stops counted.

In another aspect, the present disclosure is directed to a system for counting a unique type of stops of a wind turbine. The system includes a controller having at least one processor configured to implement a plurality of operations, including but not limited to receiving a fatigue-related loading parameter of the wind turbine, determining whether or not to count the unique type of stops of the wind turbine based, at least in part, on the fatigue-related loading parameter of the wind turbine, and implementing a control action based on a number of the unique type of stops counted.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
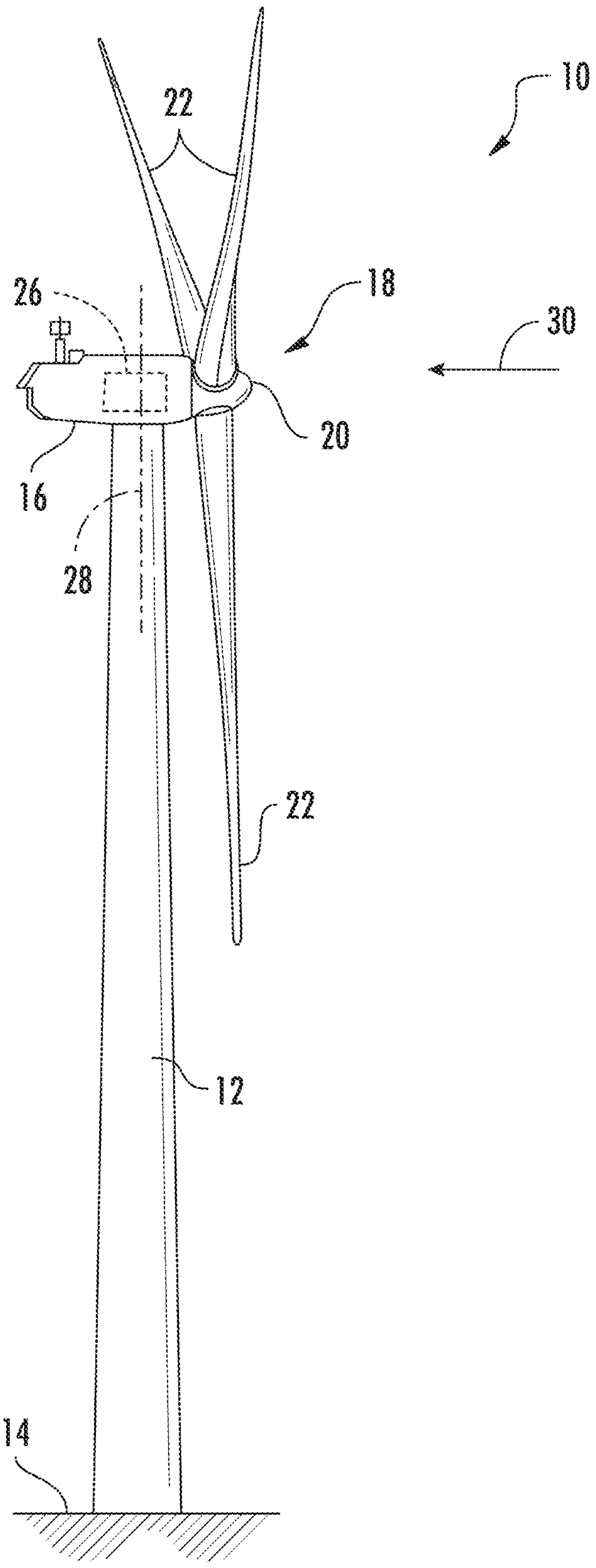
FIG. 1 illustrates a perspective view of an embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of an embodiment can be used with another embodiment to yield a still further embodiment. Thus, it is intended that the present invention covers such modifications and variations as come within the scope of the appended claims and their equivalents.

In general, the present disclosure is directed to systems and methods of counting fatigue-related bird stops. In an embodiment, the method includes monitoring or estimating a fatigue-related parameter, such as thrust, as a proxy for blade flap and tower loading. Such monitoring can be continuous or triggered by a certain condition being met. Further, such monitoring may be completed using one or more sensors, or combinations of sensors, or can be any direct or indirect sensor, measured, estimated, or calculated. The method further includes starting the wind turbine. Alternatively, the wind turbine may already be operational before monitoring begins. If the fatigue-related parameter exceeds a loading threshold (e.g., 95% of a maximum thrust), then this event can be flagged. In addition to the loading threshold, the fatigue-related parameter may also be compared to a maximum, a minimum, a root-mean-square, a statistical value, etc. Further, the loading threshold can be an absolute magnitude, a percent, a normalized value, or any other relative or absolute reference.

In addition, if a bird stop is detected and the wind turbine is commanded to shut down, this event can be flagged. In addition to shutting down, any other change in operation can be detected as well, such as derating the wind turbine. If the loading threshold was reached since the last wind turbine startup and the bird stop shutdown is commanded, the method includes counting the bird stop. In addition to simple counting, the method may also include counting of bird stops with different ranges based upon different loading thresholds to sum damage at different rates. In addition, the method may include direct counting of the damage from every unique bird stop shutdown and either summing the damage or applying a weighting factor to the bird stop. If the loading threshold is not exceeded or the bird stop shutdown is not initiated, the method does not count the bird stop. The method can then reset the thrust and bird stop flags after a bird stop is counted and repeat as often as needed. In further embodiments, such counting can be applied to field data and used to back cast the number of bird stops that are fatigue related. As such, the advanced counter of the present disclosure can be implemented in real-time or offline.

Referring now to the drawings, FIG. 1 illustrates perspective view of an embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in alternative embodiments, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown in the embodiment of FIG. 1, the wind turbine 10 includes a turbine control system or turbine controller 26 centralized within the nacelle 16. However, it should be appreciated that the turbine controller 26 may be disposed at any location on or in the wind turbine 10, at any location on the support surface 14 or generally at any other location. As is described below with reference to FIG. 3, the turbine controller 26 may generally include any suitable processing unit configured to perform the functions described herein. Thus, in several embodiments, the turbine controller 26 may include suitable computer-readable instructions that, when implemented, configure the controller 26 to perform various different actions, such as transmitting and executing wind turbine control signals, receiving and analyzing sensor signals and generating message signals.

By transmitting and executing wind turbine control signals, the turbine controller 26 may generally be configured to control the various operating modes (e.g., start-up or shut-down sequences) and/or components of the wind turbine 10. For example, the controller 26 may be configured to control a pitch angle of the rotor blades 22 and the yaw direction of the nacelle 16 about a yaw axis 28 to position the rotor blades 22 with respect to the direction 30 of the wind, thereby controlling the load and power output generated by the wind turbine 10. For example, as is described in greater detail herein, the turbine controller 26 may be configured to transmit control signals/commands to one or more pitch drive mechanisms 35 and/or yaw drive mechanisms 32 (FIG. 2) of the wind turbine 10 such that the nacelle 16 may be rotated about the yaw axis 28.

Figure 2:
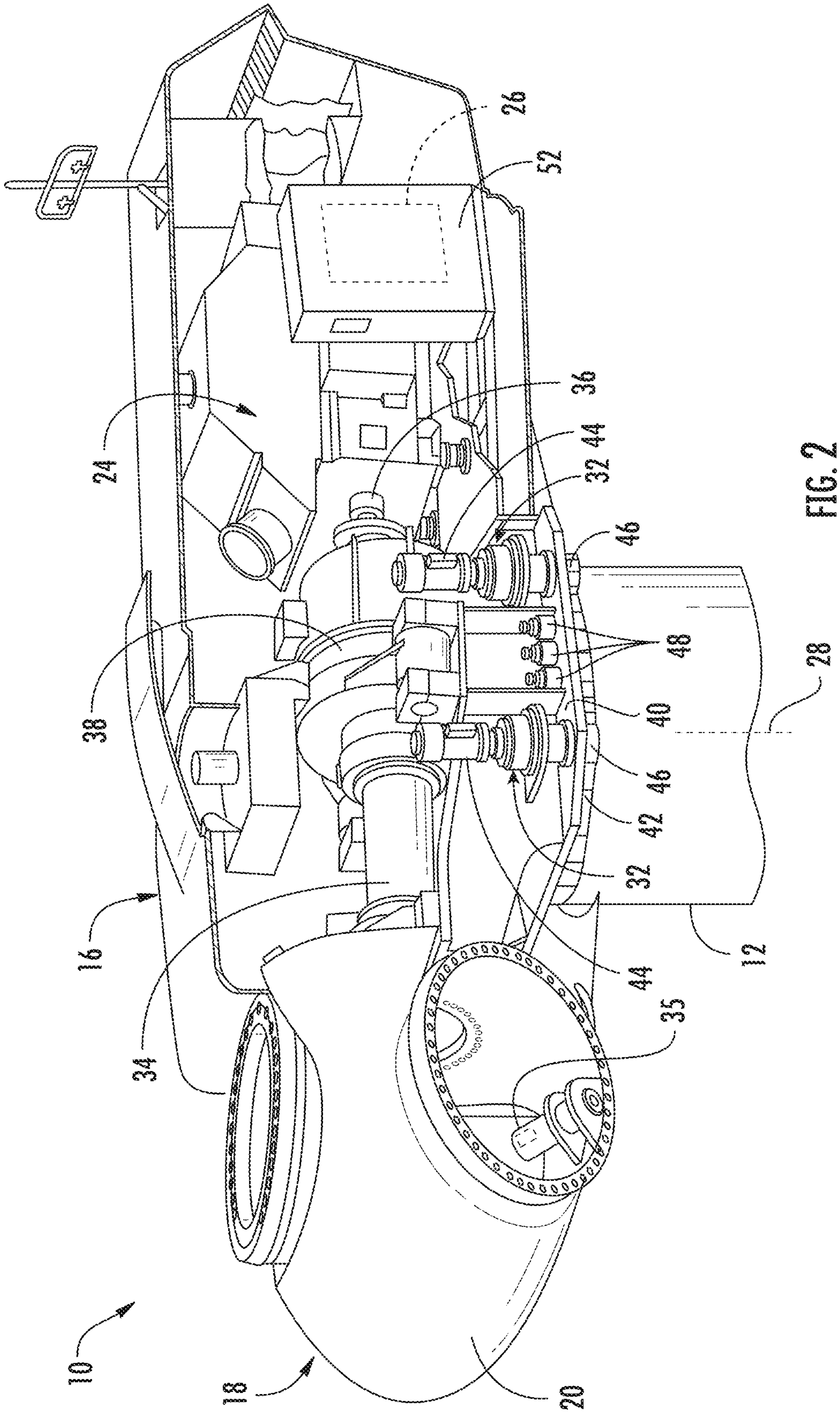
FIG. 2 illustrates a perspective, interior view of an embodiment of a nacelle of the wind turbine shown in FIG. 2.

Referring now to FIG. 2, a simplified, internal view of an embodiment of the nacelle 16 of the wind turbine 10 is illustrated. As shown, a generator 24 is disposed within the nacelle 16. In general, the generator 24 is coupled to the rotor 18 of the wind turbine 10 for generating electrical power from the rotational energy generated by the rotor 18. The rotor 18 may include a rotor shaft 34 coupled to the hub 20 for rotation therewith. The generator 24 may then be coupled to the rotor shaft 34 such that rotation of the rotor shaft 34 drives the generator 24. In the illustrated embodiment of FIG. 2, the generator 24 includes a generator shaft 36 rotatably coupled to the rotor shaft 34 through a gearbox 38. However, in other embodiments, it should be appreciated that the generator shaft 36 may be rotatably coupled directly to the rotor shaft 34. Alternatively, the generator 24 may be directly rotatably coupled to the rotor shaft 34 (often referred to as a "direct-drive wind turbine").

Additionally, as mentioned, the wind turbine 10 may include one or more pitch drive mechanisms 35 and yaw drive mechanisms 32. The pitch drive mechanism(s) 35 may be mounted within the hub and/or a respective rotor blade 22, whereas the yaw drive mechanisms 32 may be optionally mounted to and/or through a bedplate support frame 40 positioned atop the tower 12. In particular, in the illustrated embodiment of FIG. 2, each yaw drive mechanism 32 is mounted to and through the bedplate support frame 40 so as to engage a yaw bearing 42 (also referred to as a slewing ring bearing or tower ring gear) of the wind turbine 10. The yaw bearing 42 is mounted to the bedplate support frame 40 such that, as the yaw bearing 42 rotates about the yaw axis 28 (see e.g., FIG. 1), the bedplate support frame 40 and, thus, the nacelle 16 are similarly rotated about the yaw axis 28 (FIGS. 1 and 2).

In general, it should be appreciated that the pitch and yaw drive mechanisms 35, 32 may have any suitable configuration and may include any suitable components known in the art to allow such mechanisms 35, 32 to function as described herein. For example, as shown in FIG. 2, each yaw drive mechanism 32 includes a yaw motor 44 mounted to the bedplate support frame 40. The yaw motor 44 is coupled to a yaw gear 46 (e.g., a pinion gear) configured to engage the yaw bearing 42. The yaw motor 44 may be coupled to the yaw gear 46 directly (e.g., by an output shaft (not shown) extending through the bedplate support frame 40) or indirectly through a suitable gear assembly coupled between the yaw motor 44 and the yaw gear 46. As such, the torque generated by the yaw motor 44 is transmitted through the yaw gear 46 and applied to the yaw bearing 42 to permit the nacelle 16 to be rotated about the yaw axis 28. It should be appreciated that, although the illustrated wind turbine 10 is shown to include two yaw drive mechanisms 32, the wind turbine 10 may generally include any suitable number of yaw drive mechanisms 32, such as a single yaw drive mechanism 32 or more than two yaw drive mechanisms 32. Each pitch drive mechanism 35 may be similarly configured with a pitch motor coupled to a pitch gear that engages a pitch bearing.

Referring still to FIG. 2, the wind turbine 10 also includes a plurality of yaw brake assemblies 48 for controlling the rotation of the nacelle 16 about the yaw axis 28. The yaw brake assemblies 48 are mounted to and/or through the bedplate support frame 40 such that a brake pad of each yaw brake assembly 48 is frictionally engaged with a suitable friction surface of the wind turbine 10 (e.g., a surface of the yaw bearing 42) in order to stop, slow and/or otherwise control the rotation of the nacelle 16. It should be appreciated that the wind turbine 10 may generally include any suitable number of yaw brake assemblies 48. For instance, in an embodiment, the wind turbine 10 may include between twelve and twenty yaw brake assemblies 48. However, in other embodiments, the wind turbine 10 may include less than twelve yaw brake assemblies 48 or greater than twenty yaw brake assemblies 48.

Additionally, the turbine controller 26 may also be located within the nacelle 16. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, the turbine controller 26 may also be communicatively coupled to various components of the wind turbine 10 for generally controlling the wind turbine 10 and/or such components. For example, the turbine controller 26 may be communicatively coupled to the yaw drive mechanisms 32 such that suitable control signals may be transmitted to the yaw drive mechanisms 32 to allow the rotation of the nacelle 16 and the orientation of the rotor blades 22 to be controlled. Moreover, the turbine controller 26 may be communicatively coupled to the yaw brake assembly(ies) 48 such that suitable control signals may be transmitted to the yaw brake assembly(ies) 48 to engage or disengage the brakes.

Figure 3:
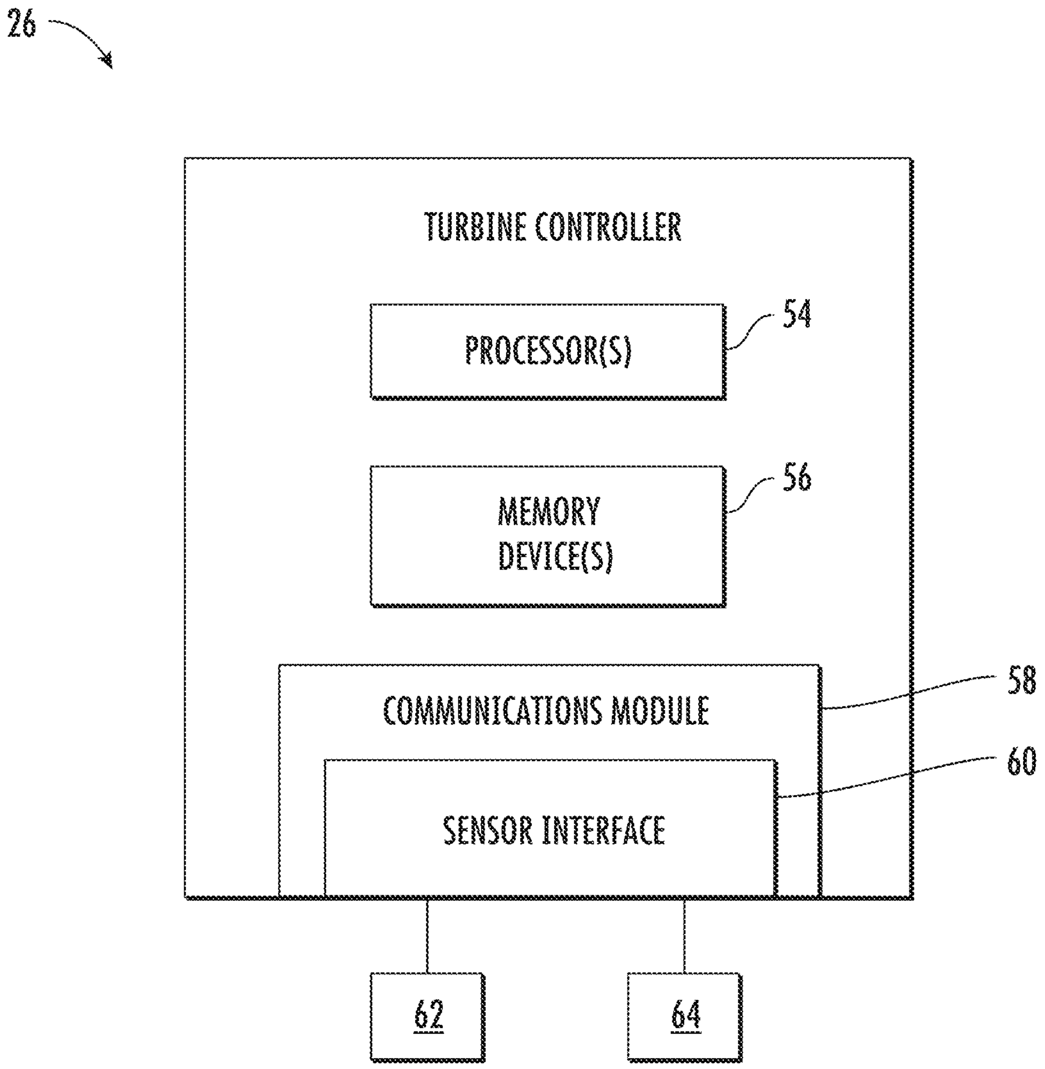
FIG. 3 illustrates a schematic diagram of an embodiment of a turbine controller of a wind turbine in accordance with aspects of the present disclosure.

Referring now to FIG. 3, there is illustrated a block diagram of an embodiment of the turbine controller 26 of the wind turbine 10. In general, the turbine controller 26 may include a computer or any other suitable processing unit. Thus, in several embodiments, the turbine controller 26 may include one or more processor(s) 54 and associated memory device(s) 56 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 56 of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 56 may generally be configured to store suitable computer-readable instructions that, when implemented by the processor(s) 54, configure the turbine controller 26 to perform various functions. The memory device(s) 56 may also be used to store temporary input and output variables and other immediate information during execution by the processor(s) 54 of the computer-readable instructions.

Additionally, as shown in FIG. 3, the turbine controller 26 may also include a communications module 58 configured to facilitate communication between the turbine controller 26 and the various components of the wind turbine 10 including the yaw brake assembly(ies) 48. In several embodiments, the communications module 58 may include a sensor interface 60 to permit various sensors 62, 64 of the wind turbine 10 to communicate with the turbine controller 26. For instance, the sensor interface 60 may include one or more analog-to-digital converters configured to convert analog signals from the sensors 62, 64 into digital signals that can be used by the processor(s) 54.

Figure 4:
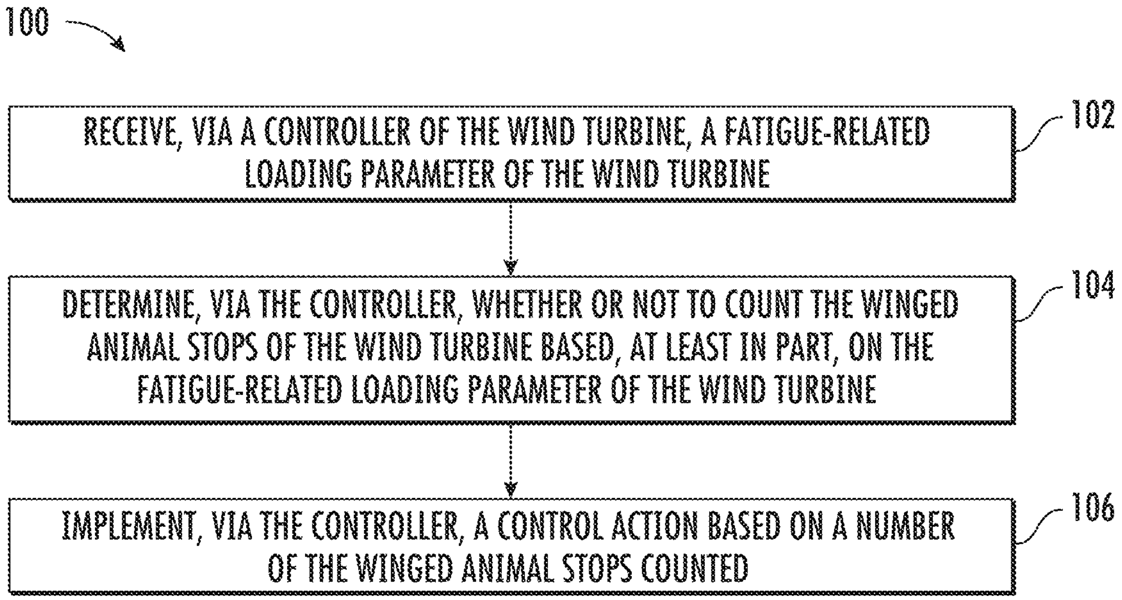
FIG. 4 illustrates a flow diagram of an embodiment of a method of counting winged animal stops of a wind turbine according to the present disclosure.

Referring now to FIG. 4, a flow diagram of an embodiment of a method 100 of counting winged animal stops (such as bird or bat stops) of a wind turbine is illustrated according to the present disclosure. In particular, the method 100 can be implemented by the wind turbine 10 described herein. However, it should be appreciated that the method 100 is discussed herein only to describe aspects of the present disclosure and is not intended to be limiting. Further, though FIG. 4 depicts a method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained with respect to the wind turbine 10 as an example, it should be appreciated that these methods may be applied to any wind turbine.

As shown at (102), the method 100 includes receiving, via a controller of the wind turbine, a fatigue-related loading parameter of the wind turbine. The controller may be the turbine controller 26, an edge controller, a cloud controller, a third party controller, or any other suitable controller. Further, in an embodiment, the fatigue-related loading parameter of the wind turbine 10 may be a thrust parameter, which is a proxy for a blade flap loading or a tower loading. Moreover, in an embodiment, the method 100 may include monitoring the fatigue-related loading parameter of the wind turbine 10 via one or more sensors, such as sensors 62, 64. Such monitoring may be continuous or may be intermittent, such as being monitored upon a trigger condition being satisfied. Alternatively, in an embodiment, the method 100 may include estimating (e.g., calculating) the fatigue-related loading parameter of the wind turbine 10 via the controller, such as turbine controller 26.

As shown at (104), the method 100 includes determining, via the controller, whether or not to count the winged animal stops of the wind turbine based, at least in part, on the fatigue-related loading parameter of the wind turbine. For example, in an embodiment, determining whether or not to count the winged animal stops of the wind turbine 10 based, at least in part, on the fatigue-related loading parameter of the wind turbine may include comparing the fatigue-related loading parameter of the wind turbine 10 to a loading threshold. In an embodiment, the loading threshold may be determined as a function of a maximum fatigue-related loading parameter, a minimum fatigue-related loading parameter, a root-mean-square of the fatigue-related loading parameter, a statistical value of the fatigue-related loading parameter, or similar. In particular embodiments, for example, the loading threshold may be set at a value based on a percentage of a maximum load (e.g., thrust), such as less than approximately 95% of the maximum thrust setting. In further embodiments, as an example, the loading threshold may be a thrust range limited by a maximum thrust and a minimum thrust.

Further, determining whether or not to count the winged animal stops of the wind turbine 10 based on the fatigue-related loading parameter of the wind turbine may include indicating (e.g., flagging) when the fatigue-related loading parameter exceeds the loading threshold. In addition, in an embodiment, determining whether or not to count the winged animal stops of the wind turbine 10 based, at least in part, on the fatigue-related loading parameter of the wind turbine may include indicating (e.g., flagging) when one of the winged animal stops is detected and the wind turbine 10 is commanded to shut down due to the winged animal stop being detected. Thus, in such embodiments, determining whether or not to count the winged animal stops of the wind turbine 10 based, at least in part, on the fatigue-related loading parameter of the wind turbine may further include counting the winged animal stop when the fatigue-related loading parameter exceeds the loading threshold since the last startup of the wind turbine 10 and when the wind turbine 10 is commanded to shut down due to the winged animal stop being detected. Alternatively, in an embodiment, determining whether or not to count the winged animal stops of the wind turbine 10 based, at least in part, on the fatigue-related loading parameter of the wind turbine may also include excluding counting of the winged animal stop when the fatigue-related loading parameter does not exceed the loading threshold since the last startup of the wind turbine 10 or the wind turbine 10 is not commanded to shut down.

In further embodiments, determining whether or not to count the winged animal stops of the wind turbine may include counting the winged animal stops having different ranges of the fatigue-related loading parameter to sum fatigue-related damage at different rates. In such embodiments, counting the winged animal stops having different ranges of the fatigue-related loading parameter to sum fatigue-related damage at different rates may include directly summing the fatigue-related damage at each of the winged animal stops or applying a weighting or scaling factor to the fatigue-related damage at each of the winged animal stops.

As shown at (106), the method 100 includes implementing, via the controller, a control action based on a number of the winged animal stops counted. More specifically, in an embodiment, the control action may include shutting down the wind turbine or modifying operation of the wind turbine. In particular embodiments, modifying operation of the wind turbine may include, for example, decreasing a speed of the wind turbine, reducing a maximum thrust setting of the wind turbine, reducing a power output of the wind turbine, pitching one or more rotor blades of the wind turbine, yawing the nacelle of the wind turbine.

Figure 5:
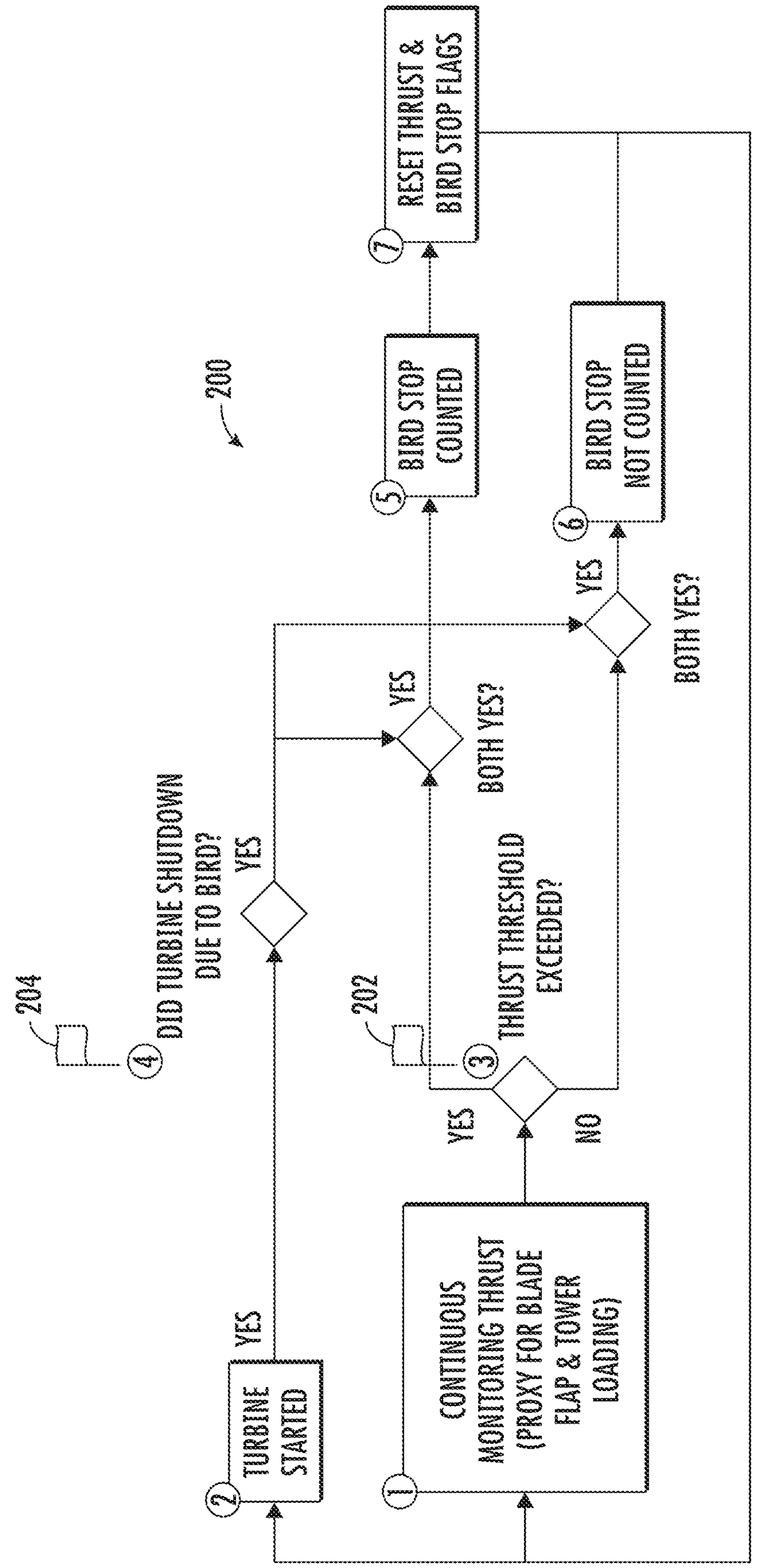
FIG. 5 illustrates a schematic diagram of an embodiment of a system for counting winged animal stops of a wind turbine according to the present disclosure.
Figure 6:
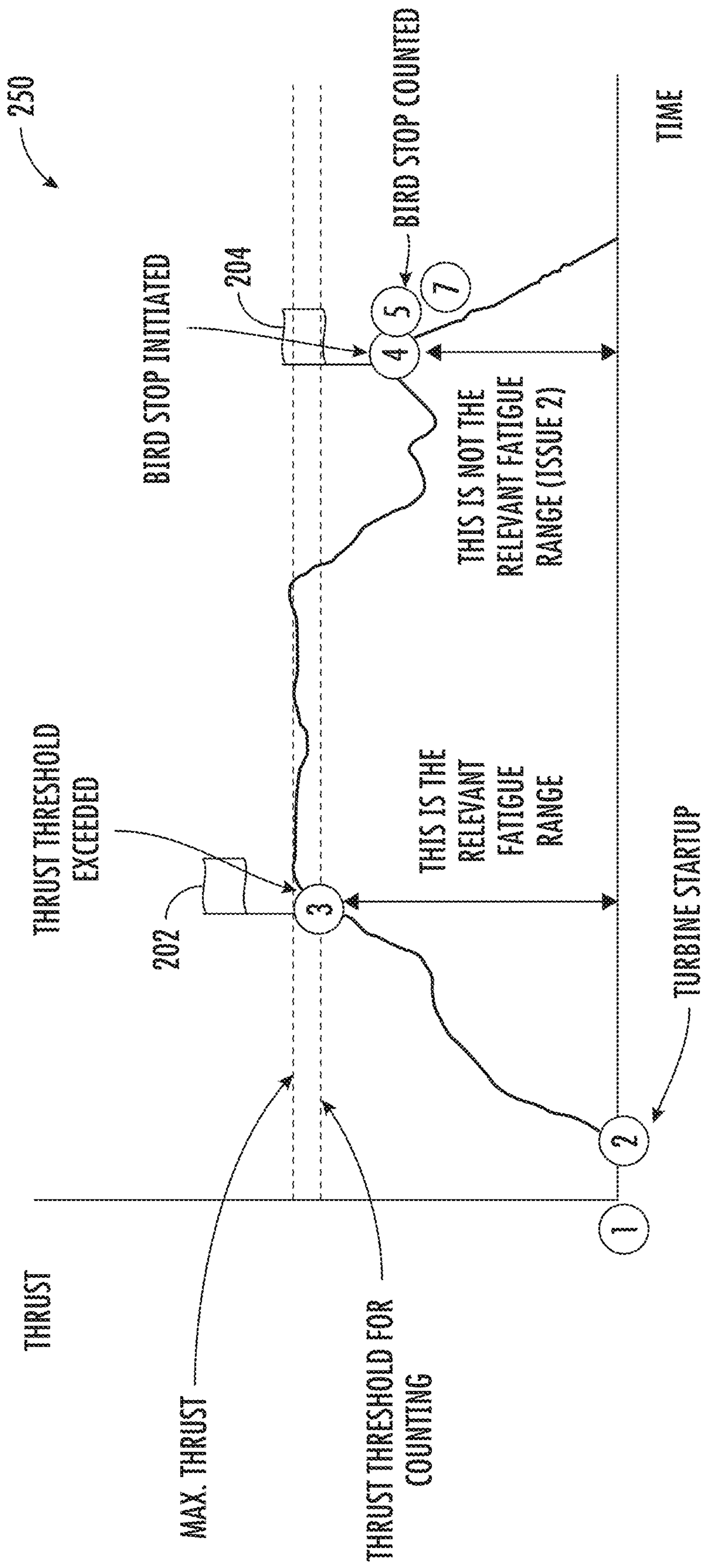
FIG. 6 illustrates a graph of thrust (y-axis) versus time (x-axis) to illustrate implementation of the system of FIG. 5.

The method 100 of FIG. 4 can be better understood with reference to FIGS. 5-10. More specifically, FIG. 5 illustrates a schematic diagram of an embodiment of a system 200 for counting winged animal stops of a wind turbine according to the present disclosure, and FIG. 6 illustrates a graph 250 of thrust (y-axis) versus time (x-axis) to illustrate implementation of the system 200 of FIG. 5, particularly illustrating a fatigue cycle between the wind turbine 10 starting up and shutting down due to a bird stop.

As shown at (1) of FIG. 5, in an embodiment, the system 200 is configured to continuously monitoring thrust (e.g., which is a proxy for blade flap and tower loading). Point (1) on the graph 250 of FIG. 6 represents the point in time when this monitoring begins. As shown at (2) of FIG. 5, the wind turbine 10 is started up. Point (2) on the graph 250 of FIG. 6 represents the point in time when the wind turbine 10 is started up. As shown at (3) of FIG. 5, the system 200 determines whether the thrust exceeds a thrust threshold. Point (3) on the graph 250 of FIG. 6 illustrates the monitored thrust exceeding the thrust threshold, which is the relevant fatigue damage range. Thus, as shown, the system 200 is configured to flag the exceedance via a thrust flag 202.

As shown at (4) of FIG. 5, the system 200 is also configured to determine whether the wind turbine 10 is or was shut down due to a bird. Point (4) on the graph 250 of FIG. 6 illustrates the point in time at which the wind turbine 10 is shut down due to the bird (e.g., bird stop is initiated), which is not the relevant fatigue damage range. In other words, the relevant fatigue damage range occurs at any point since the last startup of the wind turbine 10 and not at the time of the bird stop. Similar to point (3), the system 200 is configured to flag bird stops, e.g., via a bird stop flag 204. As shown at (5) of FIG. 5, if the wind turbine 10 is shutdown due to the bird and the thrust exceeds the thrust threshold, the system 200 is configured to count the bird stop. Point (5) on the graph 250 of FIG. 6 illustrates the point in time at which the bird stop is counted. Alternatively, as shown at (6) of FIG. 5, if the wind turbine 10 is shutdown due to a bird, but the thrust threshold is not exceeded, then the bird stop is not counted. Continuing to (7) of FIG. 5, the system 200 is then configured to reset the thrust and bird stop flags if the bird stop is counted. Point (7) on the graph 250 of FIG. 6 illustrates the point in time at which the system 300 resets the thrust and bird stop flags.

Figure 7:
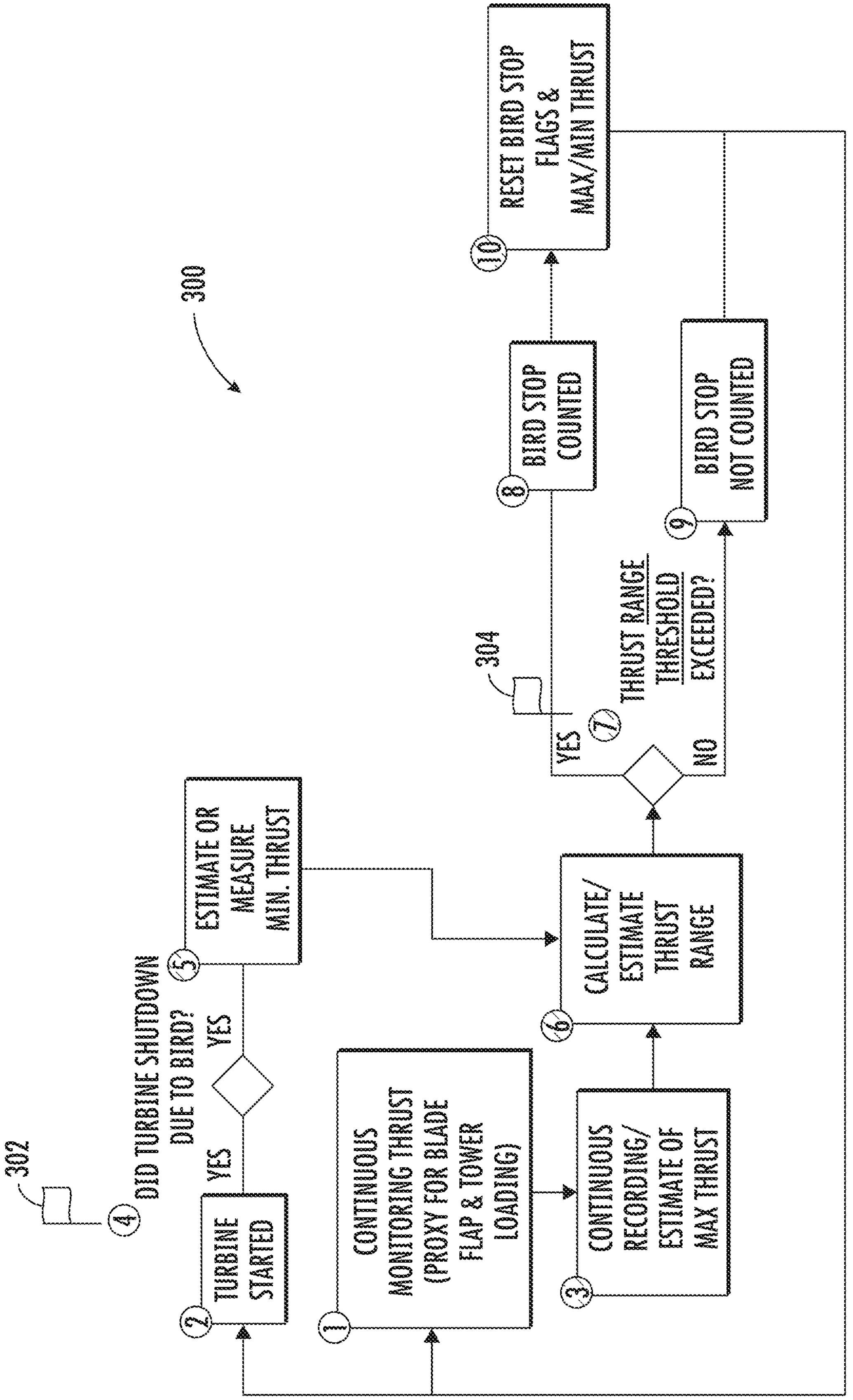
FIG. 7 illustrates a schematic diagram of an embodiment of a system for counting winged animal stops of a wind turbine according to the present disclosure.
Figure 8:
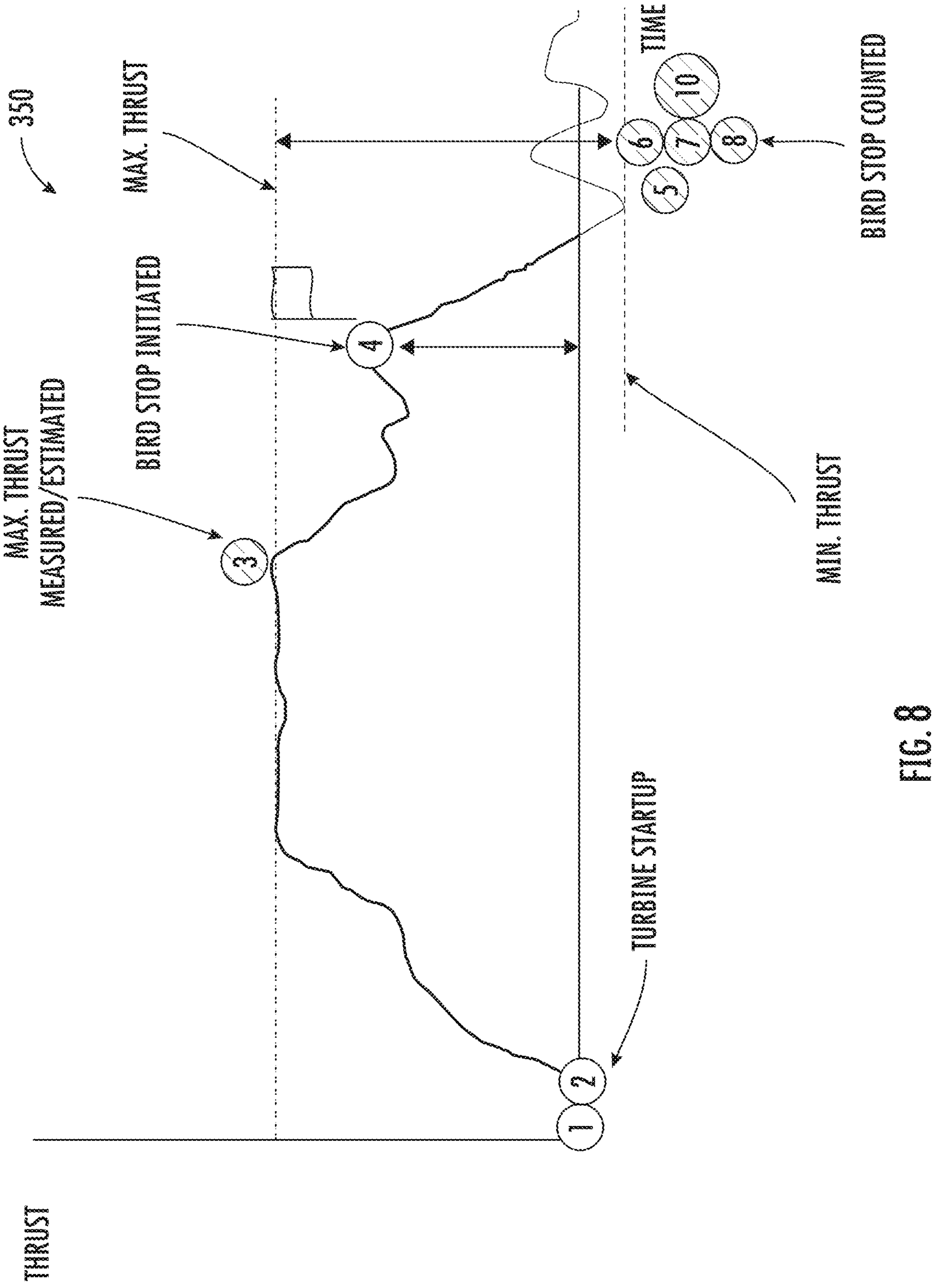
FIG. 8 illustrates a graph of thrust (y-axis) versus time (x-axis) to illustrate implementation of the system of FIG. 7.

Referring now to FIGS. 7 and 8, another embodiment of a system 300 for counting winged animal stops of a wind turbine according to the present disclosure and a corresponding graph 350 of thrust (y-axis) versus time (x-axis) to illustrate implementation of the system 300 of FIG. 7 are illustrated, particularly illustrating a fatigue cycle between the wind turbine 10 starting up and shutting down due to a bird stop. Furthermore, the embodiment illustrated in FIGS. 7 and 8 includes the ability to estimate/calculate/pre-determine from simulation a thrust range.

More specifically, as shown at (1) of FIG. 7, in an embodiment, the system 300 is configured to continuously monitoring a thrust parameter (e.g., which is a proxy for blade flap and tower loading). Point (1) on the graph 350 of FIG. 8 represents the point in time when this monitoring begins. As shown at (2) of FIG. 7, the wind turbine 10 is started up. Point (2) on the graph 350 of FIG. 8 represents the point in time when the wind turbine 10 is started up. As shown at (3) of FIG. 7, the system 300 is further configured to continuously record and/or estimate a maximum thrust parameter. Point (3) on the graph 350 of FIG. 8 illustrates the maximum thrust parameter. As shown at (4) of FIG. 7, the system 300 is also configured to determine whether the wind turbine 10 is or was shut down due to a bird. Point (4) on the graph 350 of FIG. 8 illustrates the point in time at which the wind turbine 10 is shut down due to the bird (e.g., bird stop is initiated). Furthermore, as shown, the system 300 is configured to flag this event, via a bird stop flag 302.

As shown at (5) of FIG. 7, the system 300 is also configured to estimate or measure a minimum thrust parameter. Point (5) on the graph 350 of FIG. 8 represents the minimum thrust parameter. As shown in the illustrated embodiment, the minimum thrust parameter may be a negative value (reversal), effectively making the thrust range amplitude larger. In some embodiments, the thrust sensor may not be active during shutdown, so the minimum thrust value may be estimated based upon the braking procedure selected, as well as using simulations or estimates. Moreover, the minimum thrust parameter may be based on the wind speed, speed of the wind turbine, or other turbine operating or weather condition at shutdown. Furthermore, the minimum thrust parameter may be estimated from gravity loading during idling after shutdown.

Thus, as shown at (6) of FIG. 7, the system 300 is configured to calculate or estimate a thrust range. Moreover, as shown at (7) of FIG. 7, the system 300 can then determine whether the thrust parameter is within the thrust range. If the thrust parameter is outside of the thrust range, as shown at (8) of FIG. 7, the system 300 flags the exceedance via a thrust flag 304 and counts the bird stop. If within range, as shown at (9) of FIG. 7, the system 300 does not count the bird stop. Continuing to (10) of FIG. 7, the system 300 is then configured to reset the thrust and bird stop flags if the bird stop is counted. Point (10) on the graph 350 of FIG. 8 illustrates the point in time at which the system 300 resets the thrust and bird stop flags.

Figure 9:
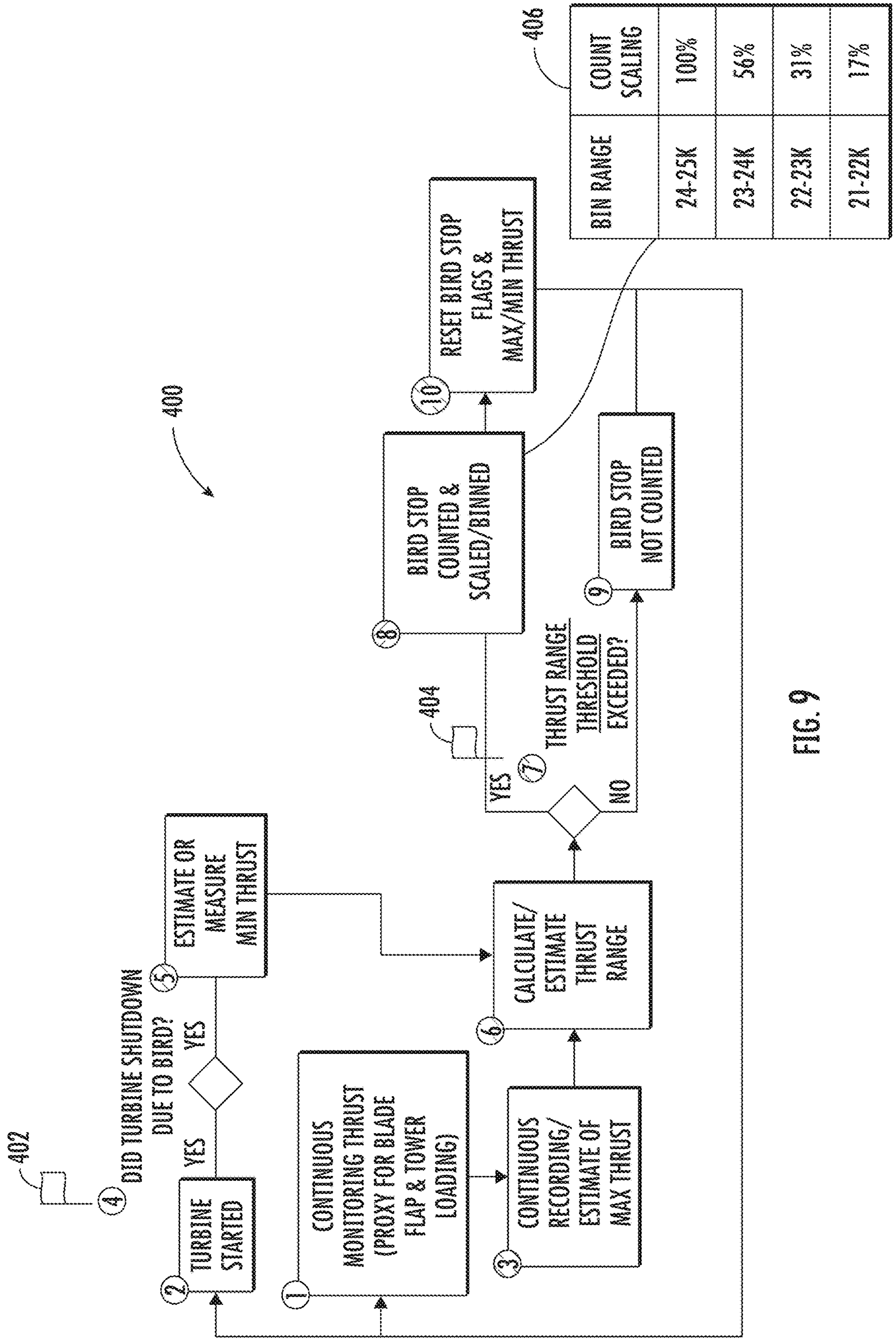
FIG. 9 illustrates a schematic diagram of an embodiment of a system for counting winged animal stops of a wind turbine according to the present disclosure.
Figure 10:
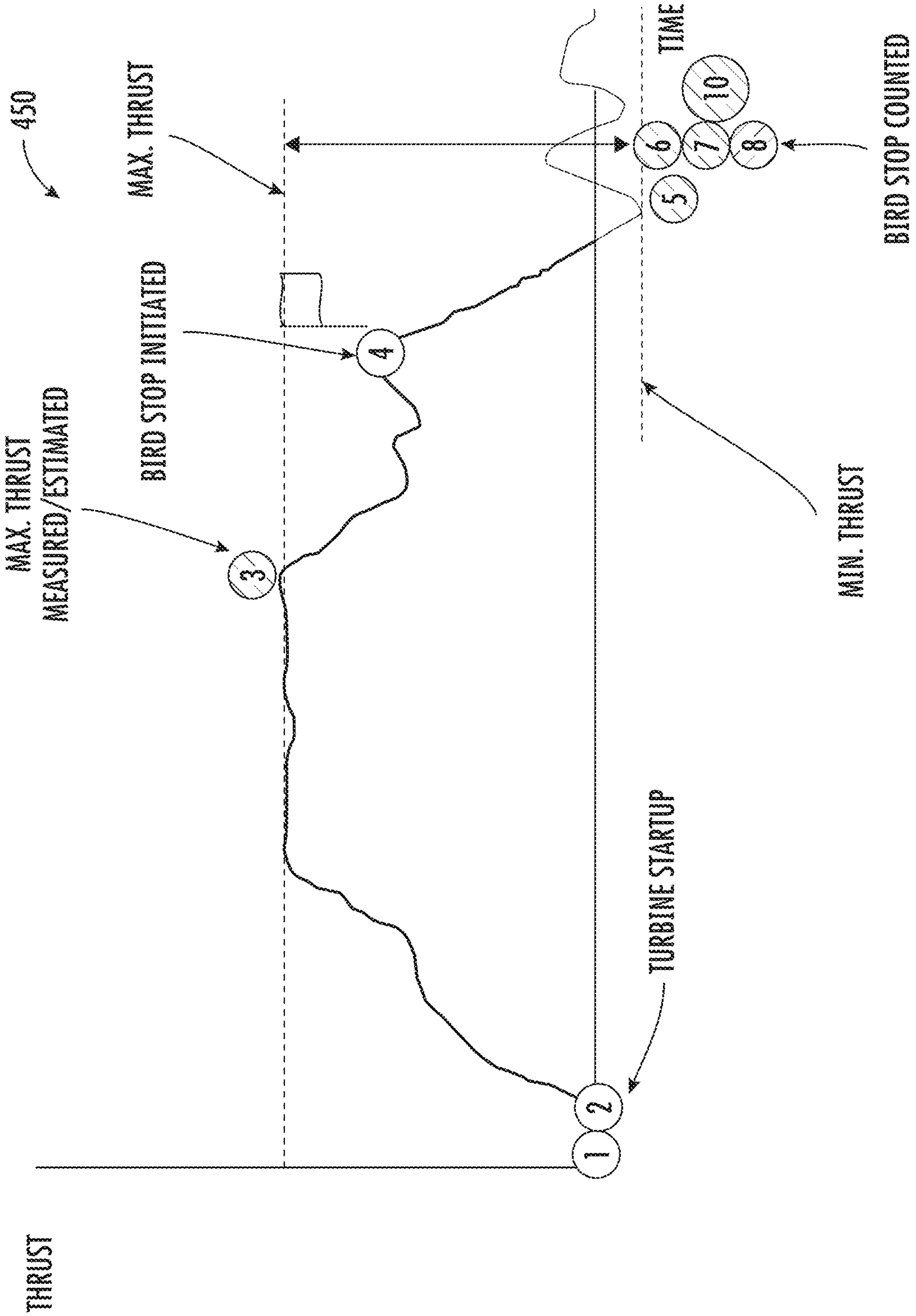
FIG. 10 illustrates a graph of thrust (y-axis) versus time (x-axis) to illustrate implementation of the system of FIG. 9.

Referring now to FIGS. 9 and 10, still another embodiment of a system 400 for counting winged animal stops of a wind turbine according to the present disclosure and a corresponding graph 450 of thrust (y-axis) versus time (x-axis) to illustrate implementation of the system 400 of FIG. 7 are illustrated, particularly illustrating a fatigue cycle between the wind turbine 10 starting up and shutting down due to a bird stop. Furthermore, the embodiment illustrated in FIGS. 9 and 10 includes the ability to estimate/calculate a thrust range as well as scaled counting.

More specifically, as shown at (1) of FIG. 9, in an embodiment, the system 400 is configured to continuously monitoring a thrust parameter (e.g., which is a proxy for blade flap and tower loading). Point (1) on the graph 450 of FIG. 10 represents the point in time when this monitoring begins. As shown at (2) of FIG. 9, the wind turbine 10 is started up. Point (2) on the graph 450 of FIG. 10 represents the point in time when the wind turbine 10 is started up. As shown at (3) of FIG. 9, the system 400 is further configured to continuously record and/or estimate a maximum thrust parameter. Point (3) on the graph 450 of FIG. 10 illustrates the maximum thrust parameter. As shown at (4) of FIG. 9, the system 400 is also configured to determine whether the wind turbine 10 is or was shut down due to a bird. Point (4) on the graph 450 of FIG. 10 illustrates the point in time at which the wind turbine 10 is shut down due to the bird (e.g., bird stop is initiated). Furthermore, as shown, the system 400 is configured to flag this event, via a bird stop flag 402.

As shown at (5) of FIG. 9, the system 400 is also configured to estimate or measure a minimum thrust parameter. Point (5) on the graph 450 of FIG. 10 represents the minimum thrust parameter. Thus, as shown at (6) of FIG. 7, the system 400 is configured to calculate or estimate a thrust range. Moreover, as shown at (7) of FIG. 9, the system 400 can then determine whether the thrust parameter is within the thrust range, and if not, the system 400 flags the exceedance via a thrust flag 404. Furthermore, as shown at (8) of FIG. 9, the system 400 is configured to count the bird stop and/or scale/bin the counted bird stop. For example, as shown, a table 406 of bin ranges of the thrust parameter and corresponding scaling factors is illustrated. As such, the table 406 can be used by the system 400 to apply higher scaling factors to higher thrust parameters (or any fatigue-related parameter) due to a bird stop.

If the thrust parameter is within the thrust range, as shown at (9) of FIG. 9, the system 400 does not count the bird stop. Continuing to (10) of FIG. 9, the system 400 is then configured to reset the thrust and bird stop flags if the bird stop is counted. Point (10) on the graph 450 of FIG. 10 illustrates the point in time at which the system 400 resets the thrust and bird stop flags.

Figure 11:
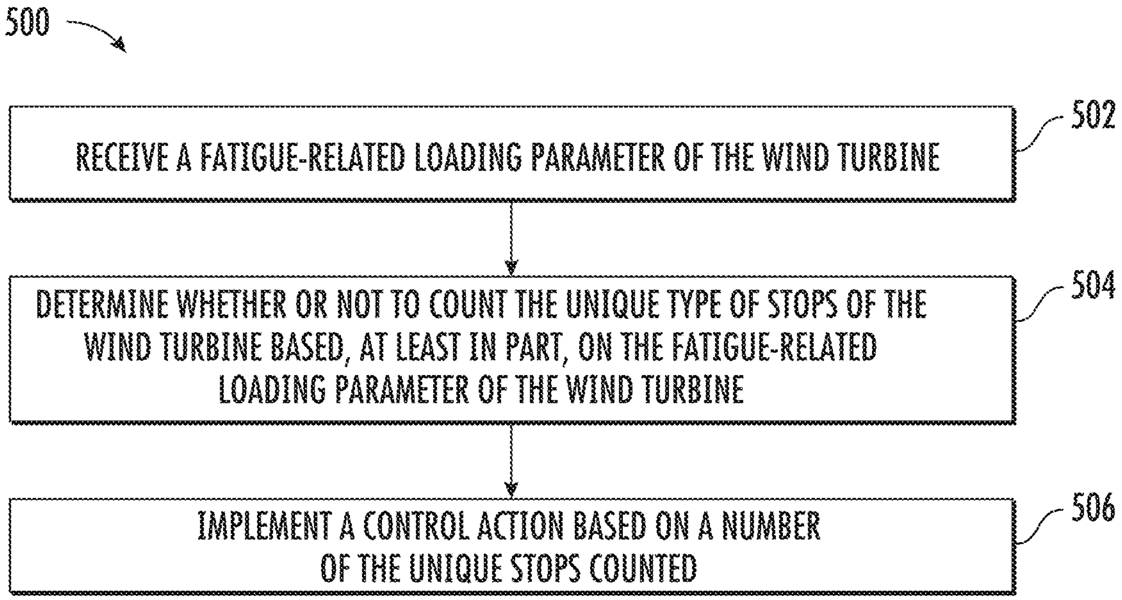
FIG. 11 illustrates a flow diagram of an embodiment of a method of counting a unique type of stops of a wind turbine according to the present disclosure.

It should be further understood that the systems and methods described herein may also be applied to counting any unique type of stops that is needed to separate such unique stops from all other types of stops. Accordingly, and referring now to FIG. 11, a flow diagram of an embodiment of a method 500 for counting a unique type of stops of a wind turbine is illustrated according to the present disclosure. Such unique stops may include, for example, bird stops, bat stops, grid-related stops, or any other stops that need to be distinguished from other type. Further, the method 500 can be implemented by the wind turbine 10 described herein. However, it should be appreciated that the method 100 is discussed herein only to describe aspects of the present disclosure and is not intended to be limiting. Further, though FIG. 11 depicts a method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained with respect to the wind turbine 10 as an example, it should be appreciated that these methods may be applied to any wind turbine.

As shown at (502), the method 500 includes receiving a fatigue-related loading parameter of the wind turbine. As shown at (504), the method 500 includes determining whether or not to count the unique type of stops of the wind turbine based, at least in part, on the fatigue-related loading parameter of the wind turbine. As shown at (506), the method 500 includes implementing a control action based on a number of the unique type of stops counted.

Further aspects of the invention are provided by the subject matter of the following clauses:

A method of counting winged animal stops of a wind turbine, the method comprising: receiving, via a controller of the wind turbine, a fatigue-related loading parameter of the wind turbine; determining, via the controller, whether or not to count the winged animal stops of the wind turbine based, at least in part, on the fatigue-related loading parameter of the wind turbine; and implementing, via the controller, a control action based on a number of the winged animal stops counted.

The method of any preceding clause, further comprising at least one of monitoring the fatigue-related loading parameter of the wind turbine via one or more sensors or estimating the fatigue-related loading parameter of the wind turbine via the controller.

The method of any preceding clause, further comprising continuously monitoring the fatigue-related loading parameter of the wind turbine via the one or more sensors.

The method of any preceding clause, further comprising monitoring the fatigue-related loading parameter of the wind turbine via the one or more sensors upon a trigger condition being satisfied.

The method of any preceding clause, wherein the fatigue-related loading parameter of the wind turbine comprises a thrust parameter, the thrust parameter being a proxy for at least one of blade flap loading or tower loading.

The method of any preceding clause, wherein determining, via the controller, whether or not to count the winged animal stops of the wind turbine based, at least in part, on the fatigue-related loading parameter of the wind turbine further comprises: comparing, via the controller, the fatigue-related loading parameter of the wind turbine to a loading threshold; indicating, via the controller, when the fatigue-related loading parameter exceeds the loading threshold; indicating, via the controller, when one of the winged animal stops is detected and the wind turbine is commanded to shut down due to the winged animal stop being detected; counting, via the controller, the winged animal stop when the fatigue-related loading parameter exceeds the loading threshold since startup of the wind turbine and the wind turbine is commanded to shut down due to the winged animal stop being detected; and excluding, via the controller, counting of the winged animal stop when the loading threshold does not exceed the loading threshold since startup of the wind turbine or the wind turbine is not commanded to shut down.

The method of any preceding clause, wherein indicating when the fatigue-related loading parameter exceeds the loading threshold further comprises: flagging, via the controller, when the fatigue-related loading parameter exceeds the loading threshold via a thrust flag.

The method of any preceding clause, wherein indicating when the winged animal stop is detected and the wind turbine is commanded to shut down due to the winged animal stop being detected further comprises: flagging, via the controller, when the winged animal stop is detected and the wind turbine is commanded to shut down due to the winged animal stop being detected via a winged animal stop flag.

The method of any preceding clause, further comprising resetting the thrust flag and the winged animal stop flag after counting the winged animal stop.

The method of any preceding clause, wherein the loading threshold is a function of at least one of a maximum fatigue-related loading parameter, a minimum fatigue-related loading parameter, a root-mean-square of the fatigue-related loading parameter, or a statistical value of the fatigue-related loading parameter.

The method of any preceding clause, wherein the loading threshold is set at a value based on a percentage of a maximum thrust or is a thrust range limited by a maximum thrust and a minimum thrust.

The method of any preceding clause, wherein the control action comprises at least one of shutting down the wind turbine or modifying operation of the wind turbine.

The method of any preceding clause, wherein determining, via the controller, whether or not to count the winged animal stops of the wind turbine based, at least in part, on the fatigue-related loading parameter of the wind turbine further comprises: counting the winged animal stops having different ranges of the fatigue-related loading parameter to sum fatigue-related damage at different rates.

The method of any preceding clause, wherein counting the winged animal stops having different ranges of the fatigue-related loading parameter to sum fatigue-related damage at different rates further comprises: directly summing the fatigue-related damage at each of the winged animal stops or applying a weighting factor to the fatigue-related damage at each of the winged animal stops.

The method of any preceding clause, wherein the controller is at least one of a turbine controller, an edge controller, a cloud controller, or a third party controller.

A system for counting a unique type of stops of a wind turbine, the system comprising: a controller comprising at least one processor configured to implement a plurality of operations, the plurality of operations further comprising: receiving a fatigue-related loading parameter of the wind turbine; determining whether or not to count the unique type of stops of the wind turbine based, at least in part, on the fatigue-related loading parameter of the wind turbine; and implementing a control action based on a number of the unique type of stops counted.

The system of any preceding clause, wherein the unique type of stops comprises at least one of bird stops, bat stops, or grid-related stops.

The system of any preceding clause, wherein determining whether or not to count the unique type of stops of the wind turbine based, at least in part, on the fatigue-related loading parameter of the wind turbine further comprises: comparing the fatigue-related loading parameter of the wind turbine to a loading threshold; indicating when the fatigue-related loading parameter exceeds the loading threshold; indicating when one of the unique type of stops is detected and the wind turbine is commanded to shut down due to the unique type of stop being detected; counting the unique type of stop when the fatigue-related loading parameter exceeds the loading threshold since startup of the wind turbine and the wind turbine is commanded to shut down due to the unique type of stop being detected; and excluding counting of the unique type of stop when the loading threshold does not exceed the loading threshold since startup of the wind turbine or the wind turbine is not commanded to shut down.

The system of any preceding clause, wherein indicating when the fatigue-related loading parameter exceeds the loading threshold further comprises flagging when the fatigue-related loading parameter exceeds the loading threshold via a thrust flag, and wherein indicating when the unique type of stop is detected and the wind turbine is commanded to shut down due to the unique type of stop being detected further comprises flagging, via the controller, when the unique type of stop is detected and the wind turbine is commanded to shut down due to the unique type of stop being detected via a stop flag.

The system of any preceding clause, further comprising resetting the thrust flag and the stop flag after counting the unique type of stop.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of counting winged animal stops of a wind turbine, the method comprising:

receiving, via a controller of the wind turbine, a fatigue-related loading parameter of the wind turbine;

determining, via the controller, whether or not to count the winged animal stops of the wind turbine based, at least in part, on the fatigue-related loading parameter of the wind turbine; and implementing, via the controller, a control action based on a number of the winged animal stops counted.

2. The method of claim 1, further comprising at least one of monitoring the fatigue-related loading parameter of the wind turbine via one or more sensors or estimating the fatigue-related loading parameter of the wind turbine via the controller.

3. The method of claim 2, further comprising continuously monitoring the fatigue-related loading parameter of the wind turbine via the one or more sensors.

4. The method of claim 2, further comprising monitoring the fatigue-related loading parameter of the wind turbine via the one or more sensors upon a trigger condition being satisfied.

5. The method of claim 1, wherein the fatigue-related loading parameter of the wind turbine comprises a thrust parameter, the thrust parameter being a proxy for at least one of blade flap loading or tower loading.

6. The method of claim 1, wherein determining, via the controller, whether or not to count the winged animal stops of the wind turbine based, at least in part, on the fatigue-related loading parameter of the wind turbine further comprises:

comparing, via the controller, the fatigue-related loading parameter of the wind turbine to a loading threshold;

indicating, via the controller, when the fatigue-related loading parameter exceeds the loading threshold;

indicating, via the controller, when one of the winged animal stops is detected and the wind turbine is commanded to shut down due to the winged animal stop being detected;

counting, via the controller, the indicated winged animal stop when the fatigue-related loading parameter exceeds the loading threshold since startup of the wind turbine; and excluding, via the controller, counting of the indicated winged animal stop when the loading threshold does not exceed the loading threshold since startup of the wind turbine.

7. The method of claim 6, wherein indicating when the fatigue-related loading parameter exceeds the loading threshold further comprises:

flagging, via the controller, when the fatigue-related loading parameter exceeds the loading threshold via a thrust flag.

8. The method of claim 7, wherein indicating when the winged animal stop is detected and the wind turbine is commanded to shut down due to the winged animal stop being detected further comprises:

flagging, via the controller, when the winged animal stop is detected and the wind turbine is commanded to shut down due to the winged animal stop being detected via a winged animal stop flag.

9. The method of claim 8, further comprising resetting the thrust flag and the winged animal stop flag after counting the winged animal stop.

10. The method of claim 6, wherein the loading threshold is a function of at least one of a maximum fatigue-related loading parameter, a minimum fatigue-related loading parameter, a root-mean-square of the fatigue-related loading parameter, or a statistical value of the fatigue-related loading parameter.

11. The method of claim 6, wherein the loading threshold is set at a value based on a percentage of a maximum thrust or is a thrust range limited by the maximum thrust and a minimum thrust.

12. The method of claim 1, wherein the control action comprises at least one of shutting down the wind turbine or modifying operation of the wind turbine.

13. The method of claim 1, wherein determining, via the controller, whether or not to count the winged animal stops of the wind turbine based, at least in part, on the fatigue-related loading parameter of the wind turbine further comprises:

counting the winged animal stops having different ranges of the fatigue-related loading parameter to sum fatigue-related damage at different rates.

14. The method of claim 13, wherein counting the winged animal stops having different ranges of the fatigue-related loading parameter to sum fatigue-related damage at different rates further comprises:

directly summing the fatigue-related damage at each of the winged animal stops or applying a weighting factor to the fatigue-related damage at each of the winged animal stops.

15. The method of claim 1, wherein the controller is at least one of a turbine controller, an edge controller, a cloud controller, or a third party controller.

16. A system for counting a unique type of stops of a wind turbine, the system comprising:

a controller comprising at least one processor configured to implement a plurality of operations, the plurality of operations further comprising:

receiving a fatigue-related loading parameter of the wind turbine;

determining whether or not to count the unique type of stops of the wind turbine based, at least in part, on the fatigue-related loading parameter of the wind turbine; and implementing a control action based on a number of the unique type of stops counted.

17. The system of claim 16, wherein the unique type of stops comprises at least one of bird stops, bat stops, or grid-related stops.

18. The system of claim 16, wherein determining whether or not to count the unique type of stops of the wind turbine based, at least in part, on the fatigue-related loading parameter of the wind turbine further comprises:

comparing the fatigue-related loading parameter of the wind turbine to a loading threshold;

indicating when the fatigue-related loading parameter exceeds the loading threshold;

indicating when one of the unique type of stops is detected and the wind turbine is commanded to shut down due to the unique type of stop being detected;

counting the unique type of stop when the fatigue-related loading parameter exceeds the loading threshold since startup of the wind turbine; and excluding counting of the unique type of stop when the loading threshold does not exceed the loading threshold since startup of the wind turbine.

19. The system of claim 18, wherein indicating when the fatigue-related loading parameter exceeds the loading threshold further comprises flagging when the fatigue-related loading parameter exceeds the loading threshold via a thrust flag, and wherein indicating when the unique type of stop is detected and the wind turbine is commanded to shut down due to the unique type of stop being detected further comprises flagging, via a stop flag by the controller.

20. The system of claim 19, further comprising resetting the thrust flag and the stop flag after counting the unique type of stop.

* * * * *